United States Patent [19]

Chiu et al.

[11] 4,265,168
[45] May 5, 1981

[54] STEAM TABLE TRAY SPACING APPARATUS

[75] Inventors: Tony T. Chiu, Los Gatos; Bruce M. Wright, San Jose; Jurgen H. Strasser, Mountain View; Bruce M. Harper, San Jose, all of Calif.

[73] Assignee: FMC Corporation, San Jose, Calif.

[21] Appl. No.: 117,593

[22] Filed: Feb. 1, 1980

Related U.S. Application Data

[62] Division of Ser. No. 951,549, Oct. 16, 1978, Pat. No. 4,225,626.

[51] Int. Cl.³ .................... A23L 3/10; A23L 3/12; A47J 27/00
[52] U.S. Cl. ........................ 99/448; 99/467; 206/821; 220/23.4; 426/412; 211/49 S
[58] Field of Search ............. 220/23.4, 23.83; 206/821, 504; 126/260, 268, 261, 262; 211/49 R, 49 S, 133; 99/359, 448, 423, 443, 467, 483, 485; 426/509, 510, 511, 119, 108, 523, 113, 232, 412, 407, 521

[56] References Cited

U.S. PATENT DOCUMENTS

| | | | |
|---|---|---|---|
| 3,084,830 | 4/1963 | Koelsch | 206/504 |
| 3,416,690 | 12/1968 | Michael | 206/503 |
| 3,677,172 | 7/1972 | Wilson | 99/448 |
| 3,836,043 | 9/1974 | Levin | 206/504 |
| 4,089,322 | 5/1978 | Guibert | 126/261 |
| 4,179,986 | 12/1979 | Mencacci | 99/359 |

FOREIGN PATENT DOCUMENTS 2154337  3/1973  Fed. Rep. of Germany ........... 206/821

OTHER PUBLICATIONS

Robe, "Retort Car Pouch/Tray Sterilizer Reduces Process Cycle Time" Food Processing, Jan. 1978.
"Army Study Foretells Surge in Commercial Use of Tray Pack", Package Engineering p. 44, Feb. 1978.
Ron Vanee, "Half-Size Steam Table Tray", Food Processing, Dec. 1977.

Primary Examiner—Robert W. Jenkins
Attorney, Agent, or Firm—R. S. Kelly; H. M. Stanley

[57] ABSTRACT

A spacer assembly for half steam table trays includes a grid-like framework upon which are mounted a plurality of non-metallic support pads adapted to accept the corners of adjacent trays laid thereon in a rectangular pattern. The framework is fabricated of a light metal functioning structurally only to position the support pads. A spacer assembly is laid atop each succeeding layer of trays and the tray corners are compressed a predetermined amount until the pads in a vertical column are in contact, whereby the pads bear the load of the trays stacked thereabove.

13 Claims, 8 Drawing Figures

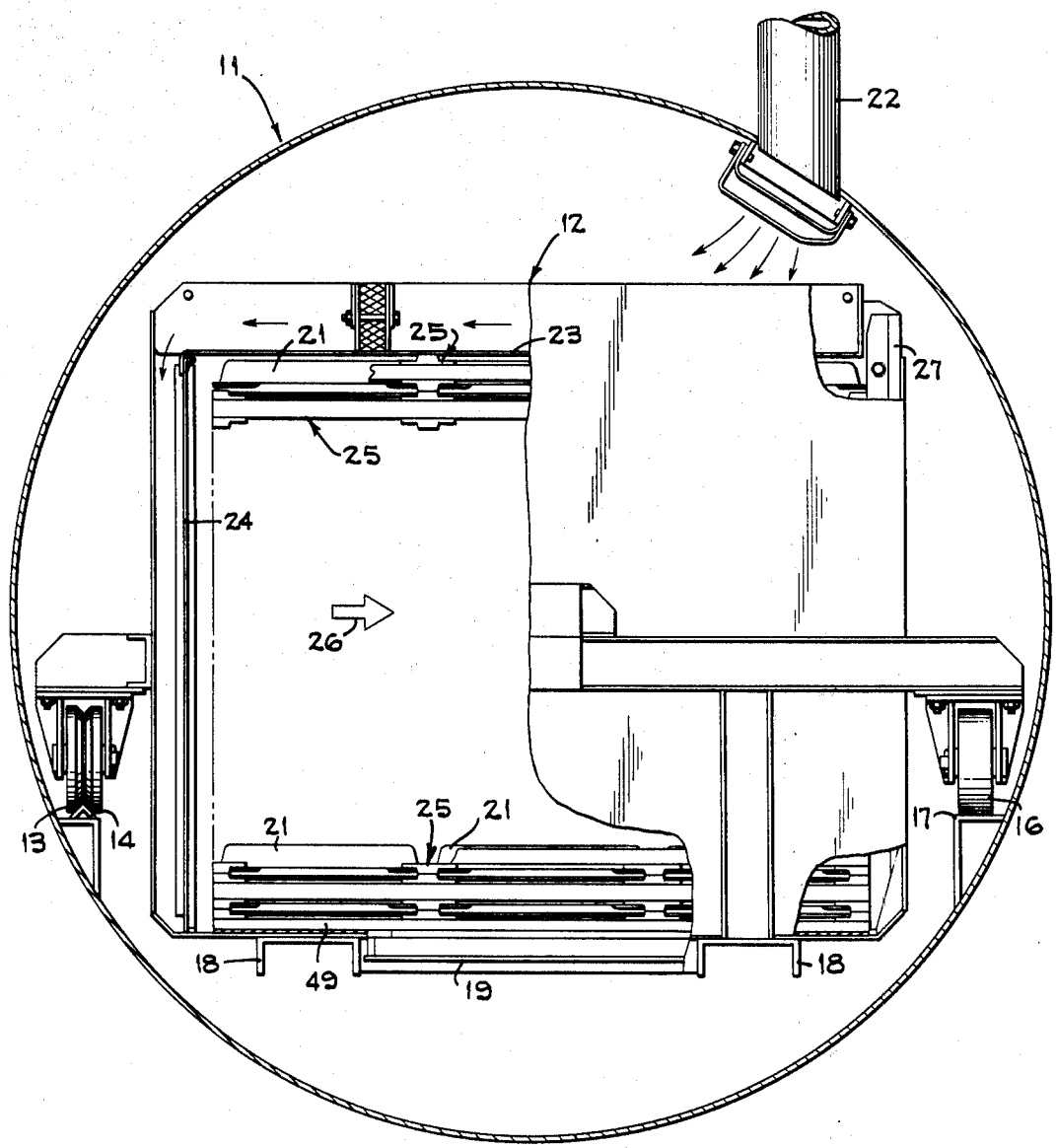
FIG_1

STEAM TABLE TRAY SPACING APPARATUS

This is a division of application Ser. No. 951,549, filed Oct. 16, 1978, now U.S. Pat. No. 4,225,626.

BACKGROUND OF THE INVENTION

1. Field of the Invention

This invention relates to a spacer assembly and method for stacking steam table trays and more particularly to such a spacer assembly and method wherein the trays are positioned and secured in a compact fashion prior to still or agitation heat processing within a retort.

2. Description of the Prior Art

Alternatives to round can food packing have been sought for sometime. The shape of round cans precludes convenient storage without waste of considerable storage space. The round can shape also requires a considerable length of time for heating the contained foodstuffs within the can to carry out a heating process providing commercial sterility, or heating prior to use. With the current emphasis on energy conservation, it becomes increasingly important to provide prepared foodstuffs which require minimal energy expenditure in accomplishing heating for processing, cooking or heating preparatory to serving.

Sealed pouches and sealed trays such as the half size steam table tray have been recently introduced into the food service market and smaller trays are envisioned which will be introduced to the consumer market in the near future. The sealed pouches and trays are generally introduced into retorts where hot water is passed around the pouch and tray surfaces to provide commercial sterility and to cook the contained ingredients prior to storage or distribution. The pouches are generally confined between two plates while the hot water is passed over the plates and around the pouches to perform the cooking operation within the retort. The plates are carried in cars which are rolled into the retort prior to the initiation of the cooking process. The steam table trays, on the other hand, are usually laid in a first layer on the floor of a retort car, and metal strips are laid on top of the first layer. An additional layer of trays is put down on top of the metal strips to separate the additional layer from the first layer so that the hot cooking water may pass therebetween. Additional metal strips are then laid down on top of the additional layer of steam trays followed by another layer of steam trays and so on until the car is filled. When the car is thereafter rolled into the retort, the door closed and the hot cooking water introduced thereto, the trays tend to shift position to the detriment of the integrity of the trays seals which receive sharp blows during such shifting. Moreover, the trays may be dented, and the lower layers of trays often are found to have faulty seals after the cooking process due to the excessive weight of the trays stacked thereabove which is born entirely by the lower layers of trays. The trays are generally fabricated from a steel material which is coated prior to filling with foodstuffs to protect the steel, thereby reducing the tendency of the trays to rust and prolonging the shelf life of the filled and processed trays, and this coating is easily damaged under conventional tray heating processes.

SUMMARY OF THE INVENTION

The present invention relates to a spacer assembly for sealed steam table trays which have been filled with foodstuffs and which are thereafter subjected to further processing such as a cooking process. A framework has frame members which are spaced to accommodate the steam table trays therebetween. A plurality of support pads are fixed to the framework members and spaced so that the corners of the steam table trays are supported on the support pads. One support pad may provicde support for one corner of each of four adjacent steam table trays. The trays are spaced from one another by the support pads and are thereby prevented from contacting one another or the framework during the further processing. The framework essentially serves to locate the support pads properly so that they are spaced to properly accept the corners of adjacent steam table trays.

The method described herein relates to the support of steam table trays during processing in a cooking retort. The trays have laterally projecting support flanges with edge located seals, such flanges being configured to tolerate only a predetermined degree of compression without incurring seal damage. A lower layer of trays is supported in a predetermined pattern so that the trays are spaced from adjacent trays. A plurality of trays are spaced in successive overlying layers in the retort in a pattern similar to that of the lower layer. The compression at the edges of the trays in underlying layers is limited so that the predetermined degree of compression is not exceeded and seal integrity is maintained.

BRIEF DESCRIPTION OF THE DRAWINGS

FIG. 1 is a transverse section through a retort showing a retort car utilizing the present invention with a portion of the car being broken away to illustrate the stacking of the trays therein.

FIG. 2 is a plan view of the spacer assembly of the present invention.

FIG. 3 is an isometric view of one embodiment of a support pad utilized in the spacer assembly of the present invention.

FIG. 4 is an isometric view of another embodiment of a support pad utilized in the spacer assembly of the present invention.

FIG. 5 is a section through one of the frame members of the spacer assembly utilizing the support pad of FIG. 3 and illustrating the trays stacked thereon.

FIG. 6 is a section through the assembly similar to FIG. 5 but therein the assembly utilizes the support pad of FIG. 4.

FIG. 7 is an isometric view of a stack of steam table trays utilizing the spacer assemblies of the present invention.

FIG. 8 is an enlarged fragmentary section taken through one corner of a representative steam table tray and a pair of spacer assembly support pads and showing a typical tray seal.

DESCRIPTION OF THE PREFERRED EMBODIMENT

FIG. 1 depicts a known type of cooking retort 11 in section in which is disposed a removable retort car 12. The car has attached to one side thereof a pair (one only being shown) of grooved wheels 13 which ride along an angled track 14 attached to the wall of the retort 11. The car 12 also has a pair (one only being shown) of cylindrical wheels 16 on the opposite side thereof which ride along a planar track 17 also attached to the wall of the retort 11. A pair of inverted U-shaped girders 18 are seen attached to the bottom of the car 12 so that the car may be removed from and inserted in the retort 11 by a forklift. An elevator bottom 19 is provided on the car 12 which bottom is arranged to be raised (by means not shown) to the top of the car at the beginning of the loading process for a series of layers of half-size steam table trays 21. The steam table trays 21 are seen to be stacked within the car 12 with a predetermined amount of space therebetween. The space is obtained by means of the spacer assemblies 25. The currently conventional half-size steam table trays measure 10⅛" in width by 12⅜" in length by 2-1/16" in depth. Such trays provide a container volume which is substantially equivalent to that of a number 10 standard round can. These and similar types of trays used in processing and storing foodstuffs have laterally projecting flanges with an edge located seal at the periphery of the flange as seen in FIG. 8. The seal is generally of the double seam type. The view in FIG. 8 is shown with the tray 21 being inverted, as in the "still cook" processing position, and with the sealed edge of the flange at the tray corner resting on a support surface 42 of a support pad 32a (FIG. 3) and being positioned thereon by contact with an abutment surface 38 of the pad. While support pads 32a are shown in FIG. 8, a support pad 32b (FIG. 4) is also capable of providing the tray positioning function by supporting the tray at the corners thereof on a support surface 46 and engaging the corners with an abutment surface 47 on the pads 32b. The support pads 32a as shown in FIG. 8 form a portion of one of the spacer assemblies 25 as will be pointed out in greater detail hereinafter. The edge of a tray cover 15 has an elastomeric compound 30 deposited thereon. The edge of a tray container body 20 surrounding the top opening of the tray is rolled over with the edge of the tray cover with the elastomer 30 positioned therebetween. An endless seal path is thus provided between the cover and the container body which is filled by the elastomer. A predetermined amount of flexing and relative motion is tolerable between the cover and container body without interrupting the seal integrity. It is to be noted here that while the remainder of this disclosure will be directed to the utilization of the invention with respect to the half-size steam table trays, other configurations of rigid, or semi-rigid, trays may be utilized with the spacer assembly disclosed herein with equal success.

When the car 12 (FIG. 1) is delivered to the retort 11 and supported therein by engagement between the tracks 14 and 17 and the wheels 13 and 16, the retort is closed and hot water at a cooking temperature is introduced through an inlet pipe 22. The hot water falls upon a flow distribution plate 23, for the still cooking process, and is thereafter directed to a space between the side of the car 12 and a vertical flow distribution plate 24. The hot water at cooking temperature passes through apertures (not shown) in the vertical flow distribution plate 24 to move between and around the stacked steam table trays 21 in the direction shown by the arrow 26. Heat transferred from the flowing hot water performs a commercial sterilization process or the cooking process for the foodstuffs contained in the steam table trays 21 in a predetermined amount of time depending upon the nature of the foodstuffs and the desired type of preparation. Having traversed the width of the car 12, the hot cooking water falls over the edge of the weir 27 attached to the opposite side of the car 12. The hot cooking water after discharge from the car 12 over the weir 27 falls to the bottom of the retort 11 where it is recovered and returned to a heating chamber (not shown) where heat is added and the water is subsequently recirculated to the inlet pipe 22. Greater detail relating to the retort cooking system just described may be found in co-pending application U.S. Ser. No. 751,923, filed Dec. 16, 1976, now U.S. Pat. No. 4,179,986, for Low Liquid Volume Retort System, which application is incorporated herein by reference.

FIG. 2 shows the spacer assembly 25 having a grid-like framework with two side frame members 28 and two end frame members 29 which are fastened together by means such as welding. A number of longitudinal frame members 31 are equally spaced between the side frame members 28 being attached to and extending between the end frame members 29. A plurality of steam table tray support pads 32 are seen to be affixed to the frame members along the longitudinal frame members. The longitudinal frame members 31 and the support pads 32 are disposed at equal spacings between the side and end frame members to accommodate the aforementioned half-size steam table trays 21. It may be seen in FIG. 2 that additional steam table tray support pads at the sides and ends of the assembly are partially cut away to provide the generally half-size pads 33 along the side and end frame members 28 and 29 and to provide the generally quarter-size pads 34 at the junctions of the side and end frame members. The frame members are light weight, small cross-section members because their primary function is to position the tray support pads 32, 33 and 34 properly to accept and support the steam table trays 21. They are not required to provide substantial structural support for the steam table trays in a bending mode. The support pads are configured to accept the corners of the steam table trays 21, and each support pad 32 is configured to accept one corner of four adjacent steam table trays. It is clear that each half-size support pad 33 is configured to accept the corners of two adjacent steam table trays while the quarter-size support pads 34 accept the corner of one steam table tray only. In this fashion a rectangular pattern of steam table trays 21 can be laid atop the grid-like spacer assembly 25 and positively positioned thereby.

Turning now to FIG. 3, one embodiment of the full support pad 32 is shown as 32a. The support pad 32a is generally in the configuration of a 4-pointed star having a groove 36 running along the underside thereof and extending between two points of the star. On the upper surface of the support pad 32a a raised area or land 37 is formed having inclined arcuate abutment surfaces 38 extending between adjacent ones of the 4-points of the star, said surfaces 38 being separated by narrow spacer surfaces 38a. A counterbored through hole 39 extends through the land 37 to the underlying groove 36. The groove 36 is formed to accept the upper edge of the longitudinal frame members 31, and the counterbored hole 39 admits a screw-type fastener 41 (seen in FIG. 2) which is accepted in an aligned hole (not shown) through the longitudinal frame members 31. It can be seen in FIGS. 2 and 3 that the inclined abutment surfaces 38 are concave and serve to guide one corner of the half-size steam table trays 21 onto the planar support surface 42 on the support pad 32a where it is snugly held by the curvature of the surface 38 which substantially conforms to the curvature at the corner of the tray. Half-size and quarter-size support pads 33 and 34, respectively, corresponding to support pad 32a have an additional groove (not shown) similar to groove 36 extending orthogonally to groove 36 so that the transversely extending frame members in the spacer assembly 25 will be accepted thereby.

An alternative embodiment 32b of the support pad 32 is seen in FIG. 4. As in the description above for the embodiment of FIG. 3, the support pad 32b is generally in the configuration of a 4-pointed star but having a deeper body section than the previously described embodiment and a relatively deeper rectangular groove 43 running along the underside thereof between two points of the star. A raised portion, or land, 44 is formed on an upper planar support surface 46. The land 44 has arcuate inclined abutment surfaces 47 extending between adjacent ones of the 4-points of the star and being separated by narrow spacer surfaces 47a. The abutment surfaces 47 are substantially the same in configuration as the inclined abutment surfaces 38 described hereinbefore in conjunction with the support pad of FIG. 3. A through counterbored hole 48 extends between the land 44 and the rectangular groove 43. Rectangular groove 43 is configured to accept the longitudinal frame members 31. It may be seen by reference to FIGS. 2 and 4 together that the support pad 32b when positioned over the longitudinal members 31 as shown may be fixed in position by means of the screw fastener 41 which passes through the counterbored hole 48 to be accepted in aligned holes (not shown) located at appropriate positions along the longitudinal frame members 31. Half-size and quarter-size support pads 33 and 34 corresponding to support pad 32b have additional grooves similar to groove 43 running orthogonally to groove 43. This allows the half-size and quarter-size support pads to fit on the frame at the frame member junctions and along the side frame members 28.

Turning now to FIG. 5 the manner in which the tray support pads 32a of FIG. 3 are assembled to the grid-like framework will be shown. An upper pad 32a is fastened to the upper portion of the longitudinal frame members 31 in an appropriately spaced position thereon by means of the screw fastener 41 as hereinbefore described. Another tray support pad 32a is positioned in reversed orientation (i.e., land 37 down) below the upper pad and the frame member 31 with the through counterbored hole 39 being aligned with the hole through the upper pad and the hole through the longitudinal frame member. When the three holes are thus aligned, the screw fastener 41, which may consist of a round head screw extending through the aligned holes and a nut engaging the lower threaded end, secures the upper and lower pads 32a at the appointed position on the longitudinal frame member 31. The half-size support pads 33 and the quarter-size support pads 34 corresponding to full pads 32a are similarly attached to the grid-like framework with upper and lower pads at the appropriate positions as seen in FIG. 7.

The corners of the steam table trays 21 are laid on top of an underlying spacer assembly 25 until a full complement of trays, twelve in this example, are set down to complete a layer. Another spacer assembly 25 is laid on top of the layer of trays with the support surfaces 42 on the inverted lower support pads 32a contacting the underside of the corners of the inverted steam table trays 21. As illustrated in FIG. 8, the support surfae 42 on the inverted pad 32a extends outwardly so that the periphery of the support surface contacts the tray substantially in the region where the underside of the tray flange meets the tray body. Thus, the tray flanges are positively positioned by the abutment surfaces 38 and firmly confined between the opposing support surfaces 42 on vertically adjacent support pads 32a. Another layer of steam table trays is laid down on the spacer assembly overlying the first layer with each corner of each tray being guided into proper position and being engaged by the inclined abutment surfaces 38 on the upper support pads 32a on the uppermost spacer assembly. In this manner alternate layers of steam table trays 21 and spacer assemblies 25 are laid down until the car 12 is filled. A typical stack height includes fifteen layers of inverted steam table trays 21.

It may been seen by reference to FIG. 5 that as the number of layers increases the weight of the layers above will increase and tend to compress the trays at the corners thereof. The trays are configured to allow a certain amount of compression at the corners. The allowable compression is a characteristic peculiar to a specific type of tray. An allowable amount of compression for the half steam table trays 21 described herein is in the order of ten thousandths of an inch. The spacing between the lands 37 on an underlying and an overlying spacer assembly 25 when no force is applied to the uppermost pad 32a is such as to be substantially equivalent to the amount of compression allowable at the corners of the steam table trays 21. Consequently, the corner on each steam table trays may be compressed only through the allowable dimension after which the adjacent lands 37 will engage. Thereafter, vertically directed force is borne by the support pads 32a and the framework members in compression only, leaving the corners of the steam table trays free from further distortion and subsequent risk of damage to the double seam seal discussed hereinbefore which runs around the periphery of the tray flange. Moreover, it may be seen in FIG. 5 that the steam table trays 21 are constrained by the spacer assemblies thereby being prevented from striking or touching one another or from striking or contacting any of the framework members in the spacer assemblies or any surrounding structure.

Referring now to FIG. 6 of the drawings, the manner in which the support pad 32b of FIG. 4 is attached to the framework members will be described. As discussed hereinabove, the support pad 32b is fitted over a longitudinal frame member 31 so that the member lies within the rectangular groove 43. The height of the support pad 32b is great enough and the groove 43 deep enough so that the body of the pad extends below the lower edge of the longitudinal frame member. The support pads 32b are fastened in place by means of the screw fasteners 41 at the appropriate positions as shown in FIG. 2 by either engaging threads in the aligned holes (not shown) in the frame members or by engaging nuts on the underside of the frame members. As in the case described for the support pad 32a above, the abutment surfaces 47 on the support pads 32b guide the corners of the steam table trays 21 onto the support surfaces 46 of the pads. When a complete layer of steam table trays 21 has been laid down atop a spacer assembly 25, another spacer assembly is laid on top of the layer of trays so that the bottoms of the support pads 32b engage the undersides of the corners of the inverted steam table trays. The bottom of an overlying support pad 32b is spaced from the land 44 of the underlying support pad 32b by the distance of allowable compression of the corners of the steam table trays, which compression will not be detrimental to the integrity of the tray seal. Thus, as the weight of successive upper layers of trays begins to bear on the tray corners of the lower elevation layers, the corners of the trays will be compressed through the allowable dimension and the bottom of each support pad 32b will come into contact with the land 44 of the support pad thereunder. Thus, the weight of the overlying layers of steam table trays will be conducted exclusively through the bodies of the support pads 32b to the floor of the car 12. As described in conjunction with the description of FIG. 5 above, the support pads 32b isolate adjacent steam table trays from contact with one another and also prevent contact between the frame members and the trays.

In FIG. 7 a typical series of layers of steam table trays 21 is shown using the invention disclosed herein. The depiction of FIG. 7 uses the support pads 32a of FIG. 3, but it is to be understood that the description applies generally to the spacer assembly 25 which may also include the support pads 32b of FIG. 4. In either instance a bottom spacer assembly 49, seen in FIG. 7, is of a special configuration. Where the support pad 32a is utilized, only the upper support pads are attached to the frame members and the bottom surfaces of the frame members are supported by the floor of the car. In the instance where the support pads 32b are used in the spacer assembly 25, the support pads 32b may be used in their usual configuration or the groove 43 may be made shallower so that the bottom edge of the frame members are allowed to contact the floor of the car. After the first layer of steam table trays 21 is laid atop the bottom spacer assembly 49, a spacer assembly 25 is laid on top thereof to contact the underlying layer of inverted steam table trays as described hereinbefore in conjunction with FIG. 5. Alternate layers of steam table trays 21 and spacer assemblies 25 are put in place as shown in FIG. 7 until the desired number of layers of inverted steam table trays 21 is obtained. The upper layer of trays is secured in fixed position in the car by using a convenient means to secure the spacer assembly overlying the upper layer in fixed position relative to the car. The trays are thereby clamped in position within the layered tray stack so that buoyant force exerted on the trays by hot cooking water during the cooking process or rotation of the stack about a horizontal axis (as occurs during agitation cooking) does not cause tray drift and subsequent damaging contact with other trays, the spacer frame members, or the car structure. Such motion of the trays and structural contact could disrupt the continuity of a protective tray coating which may be applied as hereinafter described. Thereafter, the car 12 is inserted into the retort 11 as hereinbefore described.

It may be seen by reference to FIG. 5 that a space 51 is available alongside each of the longitudinal frame members 31 when the support pads 32a are utilized to facilitate the flow of the hot cooking temperature water through the stacked array of steam table trays. Using either configuration of support pads 32a and 32b, cooking water flow laterally to the direction indicated by the arrow 26 of FIG. 1 is restricted by the longitudinal frame members and the spacer assemblies 25 are constructed to provide for approximately ¼ inch spacing between the broad surfaces of vertically adjacent steam table trays 21. thus, the hot cooking water may pass by the broad upper and lower surfaces of the trays without seeking preferential paths to accomplish an efficient heat transfer to the foodstuffs being processed therein. The trays may be fabricated from a light gauge steel material, in which case they are coated with a lacquer to provide protection from oxidation. The invention disclosed herein prevents intertray contact and contact between the trays and the framework members in the spacer assembly so that the lacquer coating is prevented from being damaged during the cooking operation whereby oxidation of the tray material is prevented and shelf life of the filled and processed trays is extended. It should be noted that with the support pad configuration 32a of FIG. 3 the spacer assembly 25 may be modified to accommodate trays having different depths by changing the height dimension of all of the members when the trays have a given flange height, a change in the dimension of the longitudinal frame members 31 separating the upper and lower support pads 32a will not affect the compression imposed at the corners of the steam table trays 21 before the lands 37 engage and bear the full portion of the remaining load exerted vertically within a stack of steam table trays. Since the support pad 32b of FIG. 4 bears the entire load when the bottom of the overlying pad contacts the land 44 on the underlying pad, it should be recognized that then the depths of the trays 21 are increased, the overall height of the support pads 32b must be increased by an appropriate amount so that the vertically adjacent support pads 32b will engage before the steam table trays 21 intrude on the desired vertical spacing therebetween.

The support pads 32, 33 and 34 must provide high impact resistance and mechanical stability up to a temperature of approximately 300° F. in consideration of the probability of rough handling and the cooking environment. One suitable material for providing the foregoing characteristics is polyphenylsulfide. A non-metallic or insulation coated metallic pad is preferable in some applications where it is desirable to avoid electrolytic action particularly where such action is detrimental to the necessary shelf life in the processed trays. Otherwise, electrically conductive pads are acceptable if they meet the other criteria mentioned herein.

Although the best modes contemplated for carrying out the present invention have been herein shown and described, it will be apparent that modification and variation may be made without departing from what is regarded to be the subject matter of the invention.

What is claimed is:

1. A spacer assembly for steam table trays to be carried in a car adapted to be disposed within a cooking retort, said assembly comprising a rectangular frame having two side frame members and two end frame members, and a plurality of equally spaced longitudinal frame members extending between said two end frame members substantially parallel to said side frame members, and a plurality of support pads attached to said longitudinal frame members and equally spaced thereon so that the distance laterally between adjacent support pads accommodates the width of a steam table tray and the distance longitudinally between adjacent support pads accommodates the length of a steam table tray, each of said support pads including a pad body having a planar support surface thereon with a centrally disposed land projecting therefrom, said land having peripherally spaced abutment surfaces extending toward said planar support surface, said planar support surface and said abutment surfaces cooperating to engage the corners of adjacent steam table trays, whereby a grid is provided which is adapted to receive a predetermined number of steam table trays in spaced relation in a predetermined pattern.

2. A spacer assembly as in claim 1 wherein said plurality of support pads includes partial support pads attached to said side frame members and at the junctions of said side frame members and said longitudinal frame members with said end frame members.

3. A spacer assembly as in claim 1 or 2 together with an additional grid having frame members and support pads configured as described in claim 1, wherein each of said centrally disposed lands has a predetermined height extending from its associated planar support surface and wherein the corners of the steam table trays will withstand a predetermined amount of compression, so that when said grid is loaded with said predetermined number of steam table trays and said additional grid is placed thereover said support pads on said additional grid overlie ones of said support pads on said first mentioned grid, and when force is applied to said additional grid in a direction to compress the tray corners the predetermined amount, each of said overlying support pads contacts an underlying support pad, whereby vertical force components are thereafter borne by said support pads rather than by the corners of the steam table trays.

4. A spacer assembly as in claim 1 or 2 wherein ones of said plurality of support pads are fixed to the top of said frame members and said lands extend away therefrom, and wherein others of said plurality of support pads are fixed to the bottom of said frame members and said lands extend away therefrom, whereby a substantially unimpeded channel extends along each side of said longitudinal frame members.

5. A spacer assembly as in claim 1 or 2 wherein each of said plurality of support pads has a slot therethrough formed to accept ones of said frame members and to position said support pads thereon, said lands extending above said frame members and the remainder of each of said support pads extending therebelow.

6. A spacer assembly for metal four cornered steam table trays which are carried in a car configured to be placed within a cooking retort, comprising a grid having grid members spaced to accommodate the steam table trays therebetween, and a plurality of non-metal support pads adapted to accept the corners of the trays, said support pads being affixed to said grid members and spaced thereon so that the corners of the steam table trays are supported thereby, whereby a predetermined pattern of spaced trays may be placed thereon without inter-tray and tray to grid contact.

7. A spacer assembly as in claim 6 wherein said plurality of non-metal support pads includes partial support pads affixed to the outer ones of said grid members.

8. A spacer assembly as in claim 6 or 7 wherein each of said plurality of non-metal support pads has a land thereon extending vertically from said grid so that when an additional grid of similar configuration is placed over the predetermined pattern of spaced trays carried on said grid and a vertical force load is applied thereto, said land contacts an inverted non-metal support pad on said additional grid, whereby said vertical force load is supported by said support pads rather than by the corners of the steam table trays.

9. A spacer assembly as in claim 8 wherein each of said plurality of non-metal support pads has a body portion underlying said land, said body portion having a slot therethrough formed to accept said grid members, said body portion extending to a position below said grid members.

10. A spacer assembly as in claim 6 or 7 wherein said plurality of non-metal support pads comprises ones thereof affixed to the upper side of said grid and others thereof affixed to the lower side of said grid, whereby substantially unobstructed channels run alongside said grid members.

11. In a tray assembly for placement within a cooking retort including a plurality of steam table trays in predetermined spaced layered array for processing while in the retort, the trays having laterally projecting flanges with sealed edges wherein the flanges are capable of a predetermined amount of compression while maintaining the integrity of the seal, a series of rectangular frameworks each having a plurality of spaced longitudinal and lateral members forming a grid-like pattern having grid openings configured to accept the steam table trays, and a plurality of support pads attached to ones of said longitudinal and lateral framework members and being spaced thereon so that the distance between laterally spaced pads provides support across the width of a tray and the distance between longitudinally spaced pads provides support across the length of a tray, said support pads including lands thereon providing contact between vertically adjacent support pads of vertically adjacent rectangular frameworks when force on the sealed edges of the trays is sufficiently great to compress the flanges the predetermined amount, so that adjacent trays are prevented from contacting one another and tray seal integrity is preserved, said lands having peripherally spaced upwardly extending abutment surfaces receiving the corners of the trays in each layer and spacing the trays in said layer.

12. The tray assembly of claim 11 wherein ones of said plurality of support pads are fixed to the tops of said longitudinal and lateral framework members and said lands extend away therefrom, and wherein others of said plurality of support pads are fixed to the bottom of said framework members and said lands extend away therefrom, whereby an unimpeded channel extends along each side of said longitudinal framework members.

13. The tray assembly of claim 11 wherein each of said plurality of support pads has a slot therethrough formed to accept ones of said longitudinal framework members and to position said support pads thereon, said lands extending above said framework members and the remainder of each of said support pads extending below said framework members.

* * * * *